(12) United States Patent
Evans et al.

(10) Patent No.: US 7,147,258 B2
(45) Date of Patent: Dec. 12, 2006

(54) BUMPER WITH NESTING ENERGY-ABSORBING END PIECE

(75) Inventors: Darin Evans, Wixom, MI (US); Mark S. White, Muskegon, MI (US); Robert J. Dornbos, Hudsonville, MI (US); William A. Wakefield, Norton Shores, MI (US)

(73) Assignee: NetShape International, LLC, Novi, MI (US)

( * ) Notice: Subject to any disclaimer, the term of this patent is extended or adjusted under 35 U.S.C. 154(b) by 0 days.

(21) Appl. No.: 11/104,250

(22) Filed: Apr. 12, 2005
(Under 37 CFR 1.47)

(65) Prior Publication Data

US 2005/0236850 A1 Oct. 27, 2005

Related U.S. Application Data

(60) Provisional application No. 60/561,737, filed on Apr. 13, 2004.

(51) Int. Cl.
*B60R 19/18* (2006.01)
(52) U.S. Cl. .................. 293/120; 293/142
(58) Field of Classification Search ........ 293/107–110, 293/120–122, 142, 126
See application file for complete search history.

(56) References Cited

U.S. PATENT DOCUMENTS

| 4,422,680 A | * | 12/1983 | Goupy ................. 293/122 |
| 4,762,352 A | * | 8/1988 | Enomoto ............... 293/120 |
| 5,092,512 A | | 3/1992 | Sturrus |
| 6,042,163 A | | 3/2000 | Reiffer |
| 6,179,353 B1 | | 1/2001 | Heatherington et al. |
| 6,308,999 B1 | * | 10/2001 | Tan et al. ............... 293/109 |
| 6,318,775 B1 | | 11/2001 | Heatherington et al. |
| 6,510,771 B1 | | 1/2003 | Sturrus et al. |
| 6,609,740 B1 | * | 8/2003 | Evans .................. 293/121 |
| 6,644,701 B1 | | 11/2003 | Weissenborn et al. |
| 6,663,150 B1 | | 12/2003 | Evans |
| 6,685,243 B1 | | 2/2004 | Evans |
| 6,695,368 B1 | | 2/2004 | Weykamp et al. |
| 6,817,638 B1 | * | 11/2004 | Choi et al. ............. 293/109 |
| 2005/0213478 A1 | * | 9/2005 | Glasgow et al. ......... 369/262 |

* cited by examiner

*Primary Examiner*—Dennis H. Pedder
(74) *Attorney, Agent, or Firm*—Price, Heneveld, Cooper, DeWitt & Litton LLP

(57) ABSTRACT

A bumper system includes a high-strength metal B-shaped beam with miter-cut end sections, a front center energy absorber, and a pair of energy-absorbing end pieces that nestingly engage front outer ends of the beam. By this arrangement, the bumper system with energy absorbers forms an impact system capable of providing good corner impact resistance. The energy-absorbing end pieces act as a low-cost and lightweight extension to the beam, and absorb energy so as to lessen intrusion and decrease the energy that is transmitted into the frame rails of the vehicle.

10 Claims, 2 Drawing Sheets

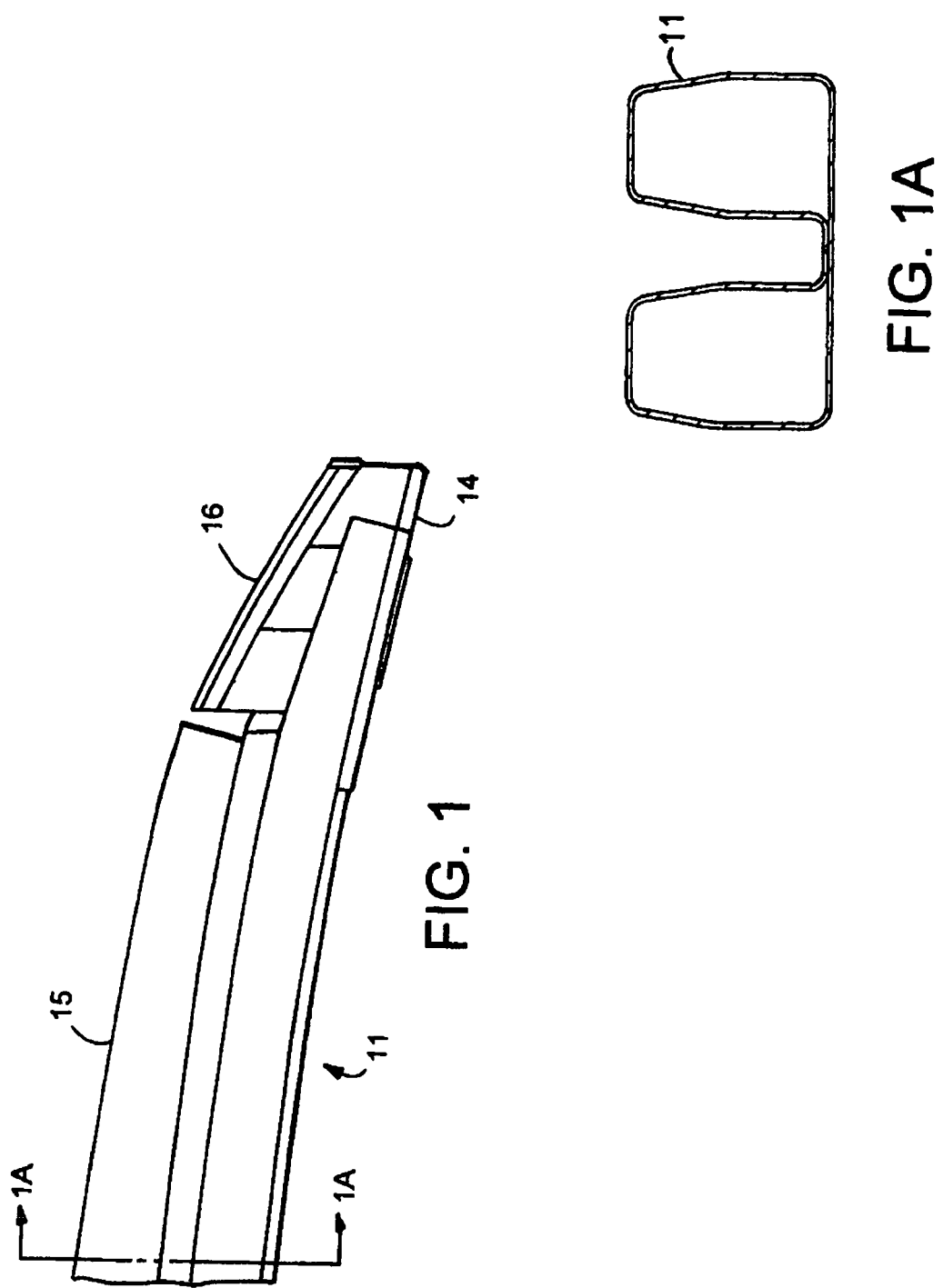

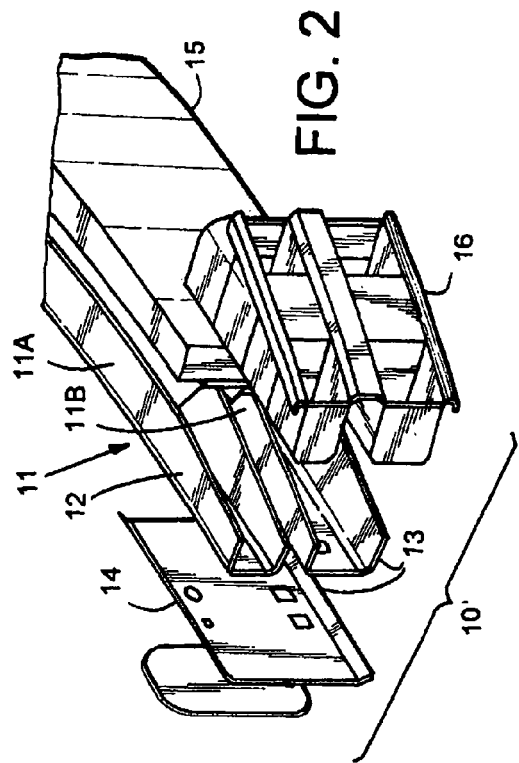
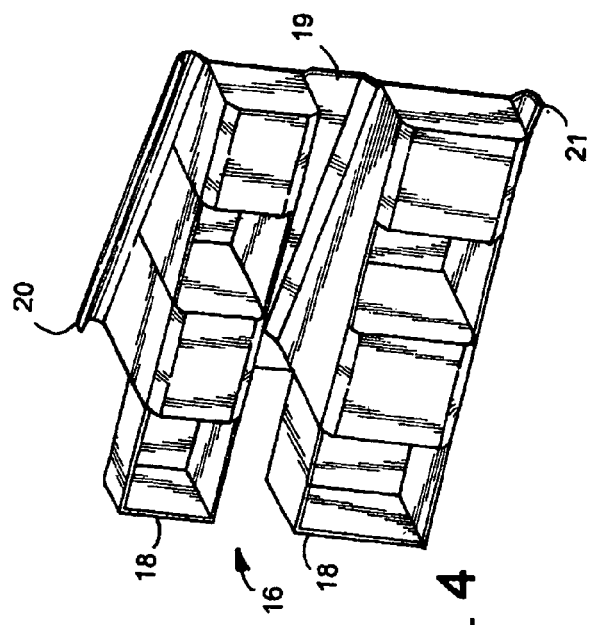
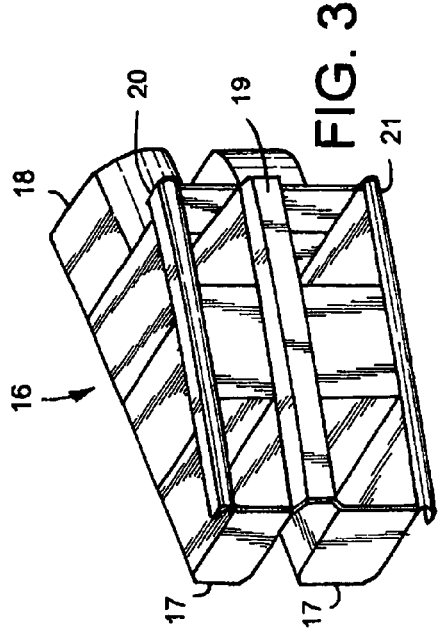

BUMPER WITH NESTING ENERGY-ABSORBING END PIECE

CROSS-REFERENCE TO RELATED APPLICATIONS

This application claims benefit of provisional application Ser. No. 60/561,737, filed Apr. 13, 2004, entitled BUMPER WITH NESTING ENERGY-ABSORBING END PIECE, the entire contents of which are incorporated herein in their entirety.

BACKGROUND

The present invention relates to vehicle bumper systems having energy absorbers, including energy-absorbing end pieces that nest against the bumper beam.

Modern vehicles have bumper systems that are both functional and aesthetic. Functionally, they must be able to withstand substantial impact requirements, including front and corner impact testing standards, such as those set by the insurance and federal agencies. Also, they must meet customer expectations concerning appearance. In particular, many modern vehicles have an aerodynamic appearance, with sweeping curved fronts, especially at vehicle corners. The vehicles are also compact in design. This results in conflicting requirements. On the one hand, the reinforcement beam must provide substantial strength for frontal impact, but must not interfere with the sweeping "rounded-off" corner designs on the vehicles. As a result, many beams have their ends modified, such as by attaching a separate component to an end of the beam to provide a mitered/angled cut on the front outer end (see U.S. Pat. No. 6,042,163, angled front surface 42 in FIG. 4). Other beams have ends that are miter cut, and then have flat plates welded onto the miter cut portion to form a sharply angled front outer surface. However, such processes are expensive, because cutting a high-strength beam is expensive, and also because weldingly attaching a secondary bracket is time consuming, expensive, and leads to inconsistencies, variables, and complications in the final components.

Thus, a system having the aforementioned advantages and solving the aforementioned problems is desired.

SUMMARY OF THE PRESENT INVENTION

In one aspect of the present invention, a bumper system includes a tubular beam having front and rear walls and horizontal walls connecting the front and rear walls, with an end of at least the front wall being removed to thus form forwardly-open pockets in the beam. An energy-absorbing end piece is nested into the pockets in each end that forms an energy-absorbing corner arrangement for corner impact.

In another aspect of the present invention, a bumper system includes a tubular beam having miter-cut ends that form forwardly-open pockets. Energy-absorbing end pieces are nested into each of the pockets to form energy-absorbing corner arrangements for corner impact. In narrower aspects, a center energy absorber is also engaged with a face of the beam, the center energy absorber and the end pieces having front surfaces that define a continuous curvilinear front support structure for fascia on the vehicle. Also in a narrower aspect, the end pieces include flanges that frictionally engage the pockets to retain the end pieces to the beam during assembly.

These and other aspects, objects, and features of the present invention will be understood and appreciated by those skilled in the art upon studying the following specification, claims, and appended drawings.

BRIEF DESCRIPTION OF DRAWINGS

FIG. 1 is a top fragmentary view of the present bumper system;

FIG. 1A is a cross-sectional view of the "B" beam of FIG. 1;

FIG. 2 is an exploded perspective view of FIG. 1; and

FIGS. 3–4 are perspective views of the energy-absorbing end pieces shown in FIGS. 1–2.

DETAILED DESCRIPTION OF PREFERRED EMBODIMENTS

A bumper system 10 (FIG. 1) includes a high-strength metal B-shaped beam 11 with miter-cut end sections 12, a front center energy absorber 15 against a face of the beam 11, and a pair of energy-absorbing end pieces 16 that nestingly engage front outer ends of the beam 11. By this arrangement, the bumper system 10 with energy absorbers 15–16 forms an impact system capable of providing impact resistance as required by Federal Motor Vehicle Safety Standards of the U.S. government, yet at a reduced cost. In particular, the energy-absorbing end pieces 16 act as a low-cost and lightweight extension to the beam 11, and absorb energy so as to lessen intrusion and decrease the energy that is transmitted into the frame rails.

The illustrated beam 11 defines two tubes 11A and 11B. (It is contemplated that the present invention could also be used on other beam sections, such as a "D" shaped beam or box beam.) Each end section 12 is miter-cut to have an angled front on its front outer ends. This allows the beam 11 to better match the aerodynamic curved shape of a front of the vehicle to which it is attached without adversely affecting a position of the fascia which covers a front (or rear) of the vehicle. The remaining material (i.e., the four exposed horizontal walls that form the "B" beam) forms a pair of forwardly and laterally open pockets or channels 13 in the two tubes 11A and 11B of the beam 11. A mounting bracket 14 is attached behind the end section 12 adjacent its outer end. The mounting bracket 14 includes a plate attached to the beam 11, such as by welding, and includes holes, apertures, or flanges configured for attachment to a vehicle frame rail.

A center energy absorber 15 is positioned against a face of the beam 11. The center energy absorber 15 can be any one of a variety of constructions, such as an injection-molded part with box-shaped energy-absorbing crush boxes, and/or foam blocks, and/or honeycomb-shaped components and/or hybrids thereof. The center energy absorber 15 defines a front surface that extends curvilinearly across a front (or rear) of a vehicle, and is useful for both absorbing energy and also supporting a fascia on the vehicle. Notably, a depth of the energy absorber 15 is not necessarily uniform, but instead is designed to provide the curvature around a front (or rear) of the vehicle as may be desired. For example, near outer ends of the center energy absorber 15, there is potentially an increasing curvature of its face surface.

The energy-absorbing end pieces 16 are injection-molded "honeycomb-shaped" components configured to be mated against each of the end sections 12. The end pieces 16 each include two rearwardly-protruding lobes 17 shaped to nestingly fit into the pockets 13 and includes two inwardly-extending tongues 18 that fit partially into an open end of the tubes 11A and 11B. It is contemplated that the tongues 18 can be eliminated in some circumstances. A center flange 19 connects the upper and lower lobes 17 of the energy absorber end piece 16, and upper and lower "J" flanges 20–21 extend upwardly and downwardly from the lobes 17, respectively, to define cavities that matingly frictionally engage the exposed walls on the end sections 12. The flanges 19–21 can be designed to provide friction for retaining the end pieces temporarily in place until the fascia is installed, or can include detent bumps or hooks that more securely frictionally engage the beam 11 for retaining them in place. The illustrated energy-absorbing end pieces 16 extend outboard of the beam 11 and include an outer portion that abuts an outer portion of the plate on the mounting bracket 14. A front surface of the end pieces 16 forms a continuous surface with the front surface of the center energy absorber 15, so as to form a continuous support surface around the front (or rear) corner of the vehicle for supporting fascia thereon. The illustrated end pieces 16 are designed so that they can be molded using injection-molding dies that do not require cutouts, slides, die pulls, or other moving die parts that make the dies more complex and higher maintenance.

The end pieces 16 nestingly engage the end of the beam 11 due to both the tongues 18 and the lobes 17. This nested arrangement is stable on the beam 11, such that the arrangement is able to withstand significant corner impact forces, despite the beam 11 terminating at the mounting bracket 14, and despite a lack of substantial energy absorber material extending outward from the mounting brackets 14. Notably, on vehicles that include side rails on their frames that are located closer to an outboard edge of the vehicle, the present bumper system 10 has been found to be particularly effective.

It is to be understood that variations and modifications can be made on the aforementioned structure without departing from the concepts of the present invention, and further it is to be understood that such concepts are intended to be covered by the following claims unless these claims by their language expressly state otherwise.

We claim:

1. A bumper system comprising:
   a tubular beam having front and rear walls, and horizontal walls connecting the front and rear walls, each end of at least the front wall being removed to thus form forwardly-open pockets in the beam; and
   an energy-absorbing end piece at each end that includes at least one lobe nested into the pockets in each end and further that includes a tongue extending from the lobe, the tongue extending longitudinally in an inboard direction through an opening in the tubular beam and telescopingly into a cavity in the tubular beam that is defined in part by a remainder of the front wall to form energy-absorbing corner arrangements for corner impact.

2. The bumper system defined in claim 1, wherein the pockets include first and second pockets at each end, and wherein the end pieces include first and second lobes that nestingly engage the first and second pockets.

3. The bumper system defined in claim 1, wherein the end piece includes a first front surface that at its inboard end generally aligns with an adjacent part of a second front surface on the front wall of the beam, but that defines an angle relative to the second front surface.

4. A bumper system comprising:
   a B-shaped tubular beam having top, bottom, and two inner horizontally-extending walls with miter-cut end sections that form a pair of vertically-spaced forwardly-open pockets; and
   energy-absorbing end pieces each having a pair of rearwardly-extending lobes connected by a longitudinally-extending center flange, the lobes being nested into each of the vertically-spaced pockets with the center flange extending across the two inner walls to cover and contain the two inner walls between the lobes to thus form energy-absorbing corner arrangements for corner impact.

5. The bumper system defined in claim 4, wherein the end pieces include tongues that extend into open ends of the tubular beam from the pockets.

6. The bumper system defined in claim 4, wherein the end pieces each include a first front surface that at its inboard end generally aligns with an adjacent part of a second front surface on the front wall of the beam, but that defines an angle relative to the second front surface.

7. A method of manufacturing a bumper comprising steps of:
   providing a tubular beam;
   miter-cutting an end of the beam to remove a front portion thereof and to expose at least one forwardly open pocket in the end; and
   inserting an energy absorber into the at least one forwardly open pocket and simultaneously telescopingly extending a tongue on the energy absorber through a longitudinal opening and into a cavity defined by the tubular beam to improve corner impact properties of the beam.

8. The bumper system defined in claim 4, including a top J flange that extends from one of the lobes and extends over the top wall, and a bottom J flange that extends from another of the lobes and extends over the bottom wall, the top and bottom J flanges engaging the top and bottom walls to stabilize the top and bottom walls during a corner impact.

9. A method of manufacturing a bumper comprising steps of:
   providing a B-shaped tubular beam having top, bottom, and two horizontally-extending inner walls;
   miter-cutting ends of the beam to remove a front portion thereof and to expose a pair of spaced-apart open pockets in each end, the pockets being defined in part by ends of the top, bottom, and inner walls;
   providing an energy absorber with two spaced apart lobes and a center flange connecting the lobes; and
   inserting the lobes of the energy absorber into the open pockets, with the inner walls being between the lobes and covered by the center flange such that the inner walls are stabilized by the lobes and center flange.

10. The method defined in claim 9, wherein the step of providing the energy absorber includes providing a top J flange that extends from one of the lobes and extends over the top wall, and a bottom J flange that extends from another of the lobes and extends over the bottom wall, and including a step of engaging the top and bottom J flanges with the top and bottom walls to stabilize the top and bottom walls during a corner impact.

* * * * *